United States Patent
Yi et al.

(10) Patent No.: US 9,207,756 B2
(45) Date of Patent: Dec. 8, 2015

(54) APPARATUS AND METHOD FOR CONTROLLING 3D IMAGE

(75) Inventors: Kwon Ju Yi, Yongin-si (KR); Sung Joo Suh, Seoul (KR); Du Sik Park, Suwon-si (KR); Byung In Yoo, Seoul (KR); Chang Kyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 64 days.

(21) Appl. No.: 13/585,258

(22) Filed: Aug. 14, 2012

(65) Prior Publication Data

US 2013/0169594 A1 Jul. 4, 2013

(30) Foreign Application Priority Data

Dec. 30, 2011 (KR) .................. 10-2011-0147193

(51) Int. Cl.
*G06F 3/01* (2006.01)
*G06F 3/0481* (2013.01)
*G06F 3/048* (2013.01)

(52) U.S. Cl.
CPC ............ *G06F 3/011* (2013.01); *G06F 3/04815* (2013.01); *G06F 3/048* (2013.01)

(58) Field of Classification Search
CPC ....... G02B 27/22; G06F 3/048; G06F 3/0425; G06F 17/2735; G06F 2213/0038; G06F 3/011; G06F 3/04815
USPC ................... 345/156–157, 173–174; 348/77; 715/850

See application file for complete search history.

(56) References Cited

U.S. PATENT DOCUMENTS

| | | | |
|---|---|---|---|
| 6,762,778 B1 * | 7/2004 | Golibrodski et al. | 715/849 |
| 7,830,377 B1 * | 11/2010 | Desimone et al. | 345/420 |
| 7,969,435 B1 * | 6/2011 | DeSimone et al. | 345/420 |
| 2004/0246234 A1 * | 12/2004 | Serra et al. | 345/168 |
| 2007/0248261 A1 | 10/2007 | Zhou et al. | |
| 2007/0279436 A1 | 12/2007 | Ng et al. | |
| 2008/0036776 A1 | 2/2008 | Niles et al. | |
| 2011/0050562 A1 * | 3/2011 | Schoen et al. | 345/156 |
| 2011/0107270 A1 * | 5/2011 | Wang et al. | 715/850 |
| 2011/0153297 A1 | 6/2011 | Keibel | |
| 2012/0005624 A1 * | 1/2012 | Vesely | 715/808 |
| 2012/0013613 A1 * | 1/2012 | Vesely | 345/419 |

FOREIGN PATENT DOCUMENTS

| | | |
|---|---|---|
| JP | 5-197416 | 8/1993 |
| JP | 11-195140 | 7/1999 |
| JP | 2003-85590 | 3/2003 |
| JP | 2005-292976 | 10/2005 |
| JP | 2010-26818 | 2/2010 |
| KR | 10-2006-0002284 | 1/2006 |

* cited by examiner

*Primary Examiner* — Md Saiful A Siddiqui
(74) *Attorney, Agent, or Firm* — NSIP Law (57) ABSTRACT

An apparatus and method for controlling a 3-dimensional (3D) image using a virtual tool are provided. The apparatus may detect a user object that controls the 3D image, and determine a target virtual tool matching movement of the user object. In addition, the apparatus may display the determined target virtual tool along with the 3D image.

20 Claims, 9 Drawing Sheets

APPARATUS AND METHOD FOR CONTROLLING 3D IMAGE

CROSS-REFERENCE TO RELATED APPLICATIONS

This application claims the priority benefit of Korean Patent Application No. 10-2011-0147193, filed on Dec. 30, 2011, in the Korean Intellectual Property Office, the disclosure of which is incorporated herein by reference.

BACKGROUND

1. Field

One or more example embodiments of the following description relate to an apparatus and method for controlling display of a 3-dimensional (3D) image according to a user object and reproducing the controlled 3D image.

2. Description of the Related Art

A 3-dimensional (3D) image control apparatus controls display of a 3D image using a multi-touch by a user object.

For example, the 3D image control apparatus may control display of a 3D image when a screen for displaying the 3D image approaches or is approximately touched by the user object or when the user object directly touches the screen.

Here, inconsistency may occur between an actual location of the user object for controlling display of the 3D image and a spatial location of a 3D image being displayed. Inconsistency in views may also occur between the user object and the 3D image being displayed. Such inconsistencies may complicate control of the 3D image.

In particular, as the user object approaches a screen to control the 3D image, the user object may be disposed between an eye of the user and the 3D image, thereby obstructing a view of the user with respect to the 3D image. In this case, a stereoscopic effect of the 3D image may be lost or the 3D image may not be naturally reproduced.

Accordingly, there is a demand for a new scheme for controlling a 3D image without a view being obstructed by a user object and for reproducing a 3D image with a natural stereoscopic effect.

SUMMARY

According to one or more example embodiments, display of a 3-dimensional (3D) image may be controlled while maintaining a stereoscopic effect of the 3D image by using a virtual tool.

The foregoing and/or other aspects are achieved by providing a 3-dimensional (3D) image control apparatus including a sensing unit to detect a user object that controls a 3D image using a virtual tool; a determining unit to determine a target virtual tool based on detection of the user object; and a displaying unit to display the target virtual tool along with the 3D image.

The displaying unit may display an execution tool of the virtual tool around the 3D image in such a manner that the user object does not reduce a stereoscopic effect of the 3D image.

The displaying unit may display an execution tool of the virtual tool around the 3D image determined based on spatial coordinates of the user object obtained by the detection of the user object and spatial coordinates of the 3D image.

The sensing unit may obtain spatial coordinates of the user object and a shape of the user object by detecting the user object.

The determination unit may determine movement of the user object based on the spatial coordinates and the shape of the user object.

The determination unit may determine an execution tool matching the movement of the user object among execution tools displayed around the 3D image, and determine the target virtual tool to be a virtual tool that corresponds to the execution tool matching the movement of the user object.

The sensing unit may be disposed on at least one of a bezel of the displaying unit and a lower portion of the displaying unit.

The displaying unit may display virtual tools of different attributes according to a type of the virtual tool set for the 3D image.

The sensing unit may detect the user object using at least one selected from a camera, an ultrasonic scanner, a laser scanner, and a sensor array.

The foregoing and/or other aspects are achieved by providing a 3D image control method including detecting a user object that controls a 3D image using a virtual tool; determining a target virtual tool based on detection of the user object; and displaying the target virtual tool along with the 3D image.

The displaying may include display an execution tool of the virtual tool around the 3D image in such a manner that the user object does not reduce a stereoscopic effect of the 3D image.

The determining may include determining an execution tool matching the movement of the user object among execution tools displayed around the 3D image; and determining the target virtual tool as a virtual tool that corresponds to the execution tool matching the movement of the user object.

The displaying may display a virtual tool having different attributes according to a type of the virtual tool set for the 3D image.

Additional aspects, features, and/or advantages of example embodiments will be set forth in part in the description which follows and, in part, will be apparent from the description, or may be learned by practice of the disclosure.

The foregoing and/or other aspects are achieved by providing a 3D image control apparatus including a displaying unit to display a 3D image, a sensing unit to detect a movement of a user object, and a determining unit to determine a target virtual tool from among a plurality of virtual tools based on the movement of the user object detected by the sensing unit, wherein the plurality of virtual tools provide for control of the display of the 3D image.

The foregoing and/or other aspects are achieved by providing a 3D image control method including displaying a 3D image concurrently with a plurality of virtual tools for controlling the display of the 3D image, and determining a peripheral space adjoining the 3D image in which each of the plurality of virtual tools can be displayed without reducing a stereoscopic effect of the 3D image, wherein each of the plurality of virtual control tools are displayed, by a display apparatus, in the peripheral space adjoining the 3D image.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Reference will now be made in detail to example embodiments, examples of which are illustrated in the accompanying drawings, wherein like reference numerals refer to the like elements throughout. Example embodiments are described below to explain the present disclosure by referring to the figures.

Figure 1:
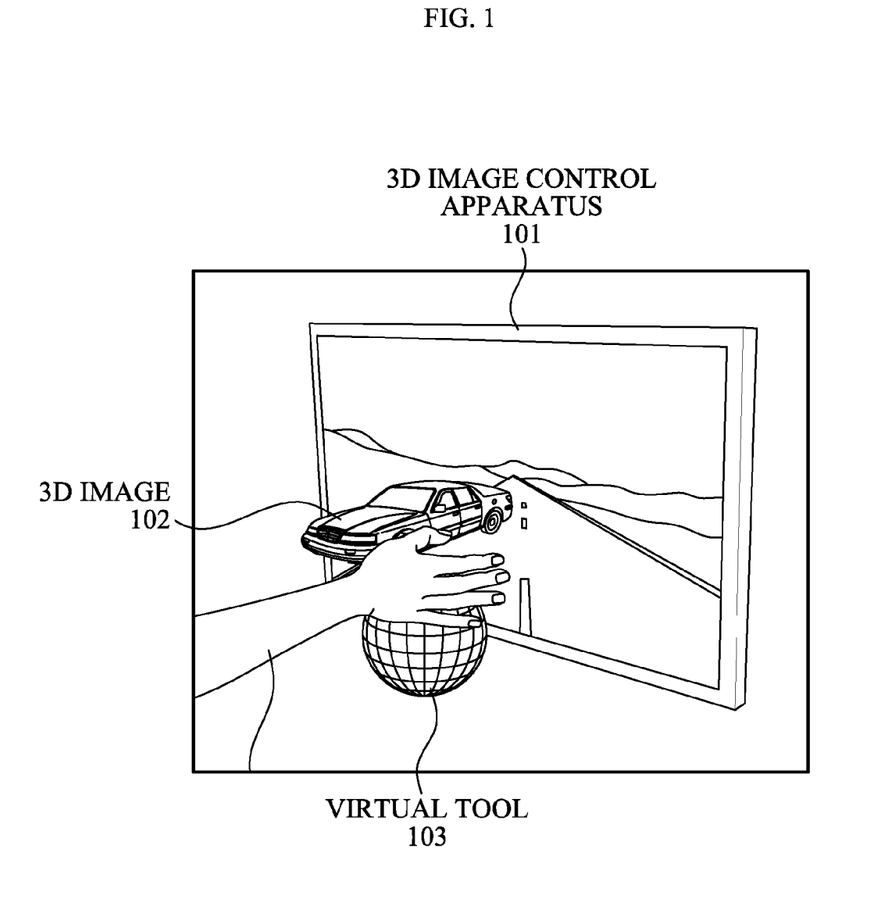
FIG. 1 illustrates an overall structure of a 3-dimensional (3D) image control apparatus according to example embodiments.
Figure 2:
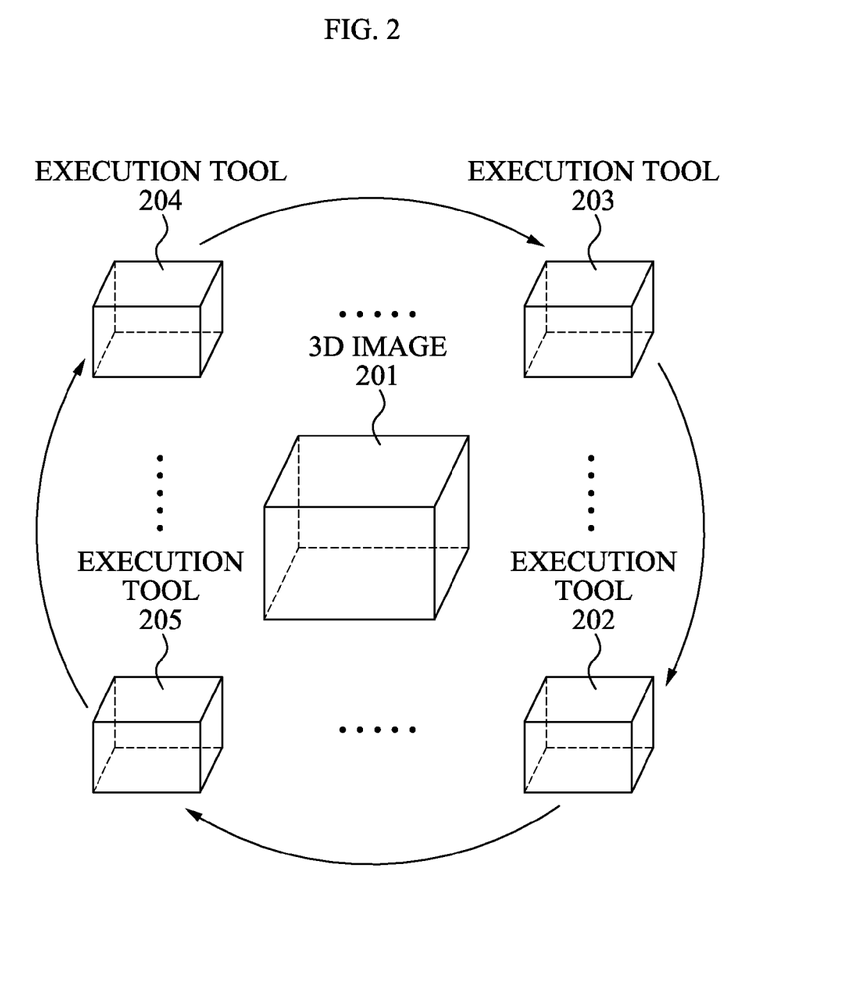
FIG. 2 illustrates a structure in which a plurality of virtual tools are displayed around a 3D image, in the 3D image control apparatus shown in FIG. 1.

FIG. 1 illustrates an overall structure of a 3-dimensional (3D) image control apparatus 101 according to example embodiments. FIG. 2 illustrates a structure in which a plurality of virtual tools are displayed around a 3D image in the 3D image control apparatus shown in FIG. 1.

Referring to FIG. 1, the 3D image control apparatus 101 may display a 3D image 102 and a virtual tool 103 for controlling display of the 3D image 102.

The 3D image control apparatus 101 may display the virtual tool 103 such that a stereoscopic effect of the 3D image 102 to a user is not reduced. A user object, that is, an operation tool used by the user to control the 3D image 102, may include a hand of the user, a stylus, a stick, a pen, and the like. The virtual tool may be a control tool set for the 3D image, corresponding to a task for controlling the 3D image. For example, the virtual tool may include a virtual movement tool for controlling movement of the 3D image, a virtual rotation tool for controlling rotation of the 3D image, a virtual cutting tool for controlling cutting, and a virtual scaling tool for controlling scaling of the 3D image.

For example, referring to FIG. 2, the 3D image control apparatus 101 may display execution tools 202 to 205 of the virtual tool around the 3D image 201. In an embodiment, the 3D image control apparatus 101 may display execution tools 202 to 205 around the 3D image 201 to avoid reducing a stereoscopic effect of the 3D image and to avoid obscuring the view of 3D image 201. The 3D image control apparatus 101 may determine a peripheral space adjoining the 3D image as a space in which a stereoscopic effect of the 3D image is not reduced, based on spatial coordinates of the 3D image and spatial coordinates of the user object obtained by detecting the user object. In addition, the 3D image control apparatus 101 may display the execution tools 202 to 205 of the virtual tool in the space. Here, execution tools 202 to 205 include tools provided for execution of the virtual tool. The execution tools 202 to 205 may be in the form of an icon, a menu, an animation, an image, and the like.

The 3D image control apparatus 101 may determine movement of the user object based on the spatial coordinates of the detected user object and a shape of the user object. For example, the movement of the user object may include a gesture of the user object.

Next, the 3D image control apparatus 101 may determine an execution tool matching the movement of the user object, among the execution tools displayed around the 3D image.

In addition, the 3D image control apparatus 101 may determine a target virtual tool as a virtual tool that corresponds to the execution tool matching the movement of the user object.

Therefore, the 3D image control apparatus 101 may display the 3D image and the target virtual tool together. The target virtual tool and the 3D image being displayed may be changed corresponding to the movement of the user object. Here, the movement may include the gesture and a shape of the user object.

Figure 3:
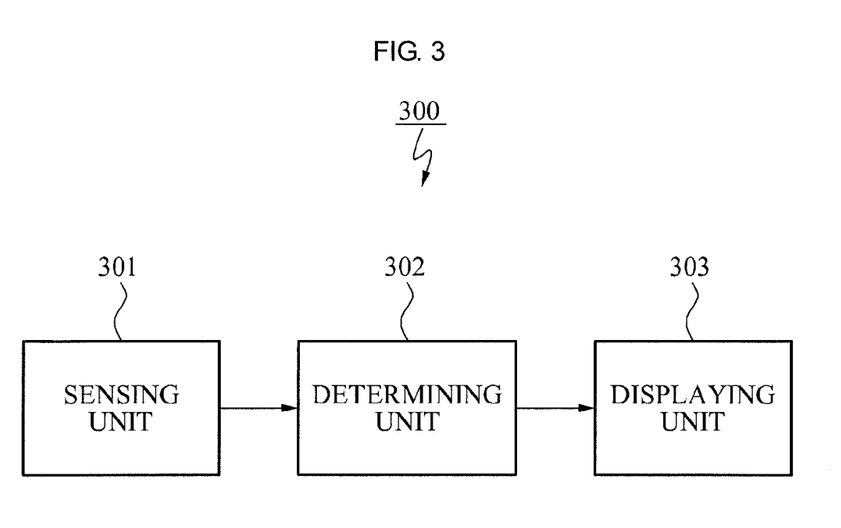
FIG. 3 illustrates a detailed structure of a 3D image control apparatus according to example embodiments.

FIG. 3 illustrates a detailed structure of a 3D image control apparatus 300 according to example embodiments.

According to FIG. 3, the 3D image control apparatus 300 may include, for example, a sensing unit 301, a determining unit 302, and a displaying unit 303.

The sensing unit 301 may detect a user object for controlling a 3D image using a virtual tool.

The user object may include a hand of a user, a stylus, a stick, a pen, and the like. The virtual tool may be a control tool set for the 3D image corresponding to a task for controlling the 3D image. For example, the virtual tool may include a virtual movement tool for controlling movement of the 3D image, virtual rotation tool for controlling rotation of the 3D image, a virtual cutting tool for controlling cutting, and a virtual scaling tool for controlling scaling of the 3D image.

The sensing unit 301 may be disposed on at least one of a bezel of the displaying unit 303 and a lower portion of the displaying unit 303, to detect the user object. Here, the sensing unit 301 may include at least one selected from a camera, an ultrasonic scanner, a laser scanner, and a sensor array.

For example, at least one of a camera, an ultrasonic scanner, or a laser scanner may be disposed at the bezel of the displaying unit 303. The camera may be a depth camera, a multi-view camera, or the like. When the laser scanner is used, the sensing unit 301 may detect the user object by performing laser scanning.

In an alternative embodiment, the sensor array may be disposed at an inside or the lower portion of the displaying unit 303. When the sensor array is used in this manner, the sensing unit 301 may detect not only spatial coordinates of the user object but also a distance from the 3D image to the user object and a shape of the user object.

As mentioned, the sensing unit 301 may obtain the spatial coordinates and the shape of the user object by detecting the user object. When the sensor array is used, the sensing unit 301 may additionally obtain the distance from the 3D image to the user object.

The determining unit 302 may determine the movement of the user object based on the spatial coordinates and the shape of the user object. Here, the movement of the user object may include the gesture of the user object.

Next, the determining unit 302 may determine an execution tool matching the movement of the user object, among execution tools displayed around the 3D image. In addition, the determining unit 302 may determine a target virtual tool to be a virtual tool that corresponds to the execution tool matching the movement of the user object.

For example, when a hand of the user is used as the user object, the determining unit 302 may determine that the hand of the user is making a vertical cutting gesture, based on the spatial coordinates and the shape of the user object. That is, the determining unit 302 may determine that the movement of the user object corresponds to a cutting motion.

In addition, the determining unit 302 may determine an execution tool matching the cutting motion, among the execution tools of the virtual tool being displayed, and may also determine a virtual cutting tool corresponding to the determined execution tool as the target virtual tool.

The displaying unit 303 may display the execution tools of the virtual tool around the 3D image. Here, the displaying unit 303 may display at least one execution tool in the form of an icon, a menu, an animation, an image, and the like, around the 3D image.

In addition, the displaying unit 303 may display the target virtual tool matching the movement of the user object along with the 3D image.

For example, when an execution tool 1 corresponding to the virtual cutting tool, an execution tool 2 corresponding to a virtual movement tool, an execution tool 3 corresponding to a virtual rotation tool, and an execution tool 4 corresponding to a virtual scaling tool are displayed around the 3D image, and when the movement of the user object corresponds to the cutting, the determining unit 302 may determine the virtual cutting tool corresponding to the execution tool 1 to be the target virtual tool. Therefore, the displaying unit 303 may display the 3D image and the target virtual tool concurrently. In an embodiment, the displaying unit 303 may display the 3D image and the target virtual tool concurrently while not displaying any of the other execution tools. In another embodiment, the displaying unit 303 may display the execution tools concurrently with the 3D image while highlighting the target virtual tool matching the movement of the user object. The target virtual tool may be highlighted by making it brighter, larger, or of a different color than the other execution tools or by making its appearance different than the other execution tools. Here, the displaying unit 303 may display the target virtual tool around the 3D image so that the stereoscopic effect of the 3D image is not reduced. For example, the virtual cutting tool may have attributes of a knife, scissors, a paper knife, and the like. That is, the displaying unit 303 may display the cutting virtual tool in the form of the knife, the scissors, the paper knife, and the like so that the user object may conveniently control cutting of the 3D image.

As mentioned, the displaying unit 303 may display virtual tools having different attributes according to a type of the virtual tool. For example, when the target virtual tool is the virtual rotation tool, the displaying unit 303 may display the virtual rotation tool in the form of a trackball so that the user object may conveniently control rotation of the 3D image. When the target virtual tool is the virtual scaling tool, the displaying unit 303 may display the virtual scaling tool in the form of a toolbar so that the user object may conveniently control zoom-in and zoom-out of the 3D image. In a similar manner, when the target virtual tool is the virtual movement tool, the displaying unit 303 may display the virtual movement tool in the form of a fork, an arrow, or pliers so that the user object may conveniently control movement of the 3D image.

Therefore, the sensing unit 301 may detect the user object controlling the 3D image, using the target virtual tool. In addition, the determining unit 302 may determine a target 3D image intended to be changed, based on the movement of the user object determined through the detection of the user object. Accordingly, the displaying unit 303 may display the determined target 3D image.

For example, when the target virtual tool is the virtual cutting tool, and when the user object performs cutting of the 3D image using the virtual cutting tool, the sensing unit 301 may detect the user object which is cutting the 3D image. Therefore, the determining unit 303 may determine whether the movement of the user object represents horizontal cutting, vertical cutting, diagonal cutting, single-cutting, double-cutting, and the like, based on the spatial coordinates and the shape of the user object. Additionally, the determining unit 303 may determine a 3D image matching the movement of the user object as the target 3D image. Accordingly, the displaying unit 303 may display the target 3D image along with the target virtual tool.

Figure 4:
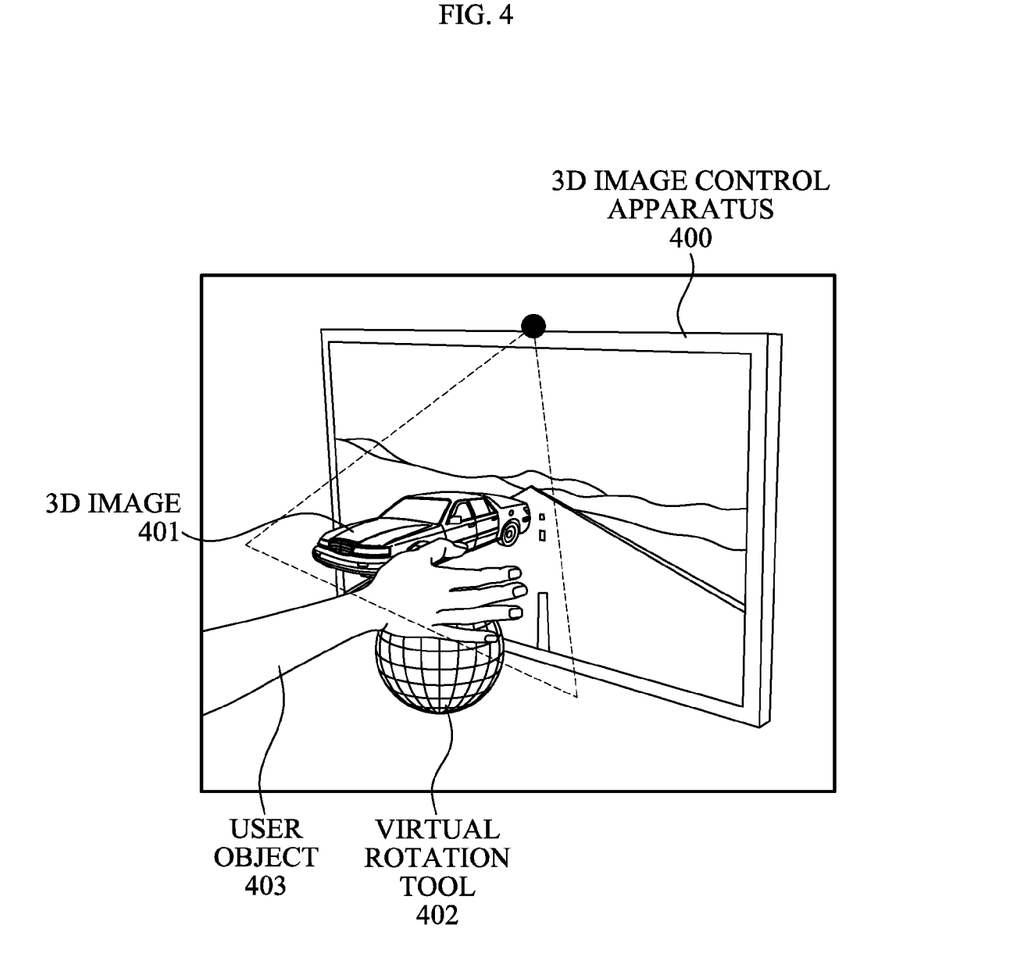
FIG. 4 illustrates an operation of controlling a 3D image using a virtual rotation tool in the 3D image control apparatus shown in FIG. 3.

FIG. 4 illustrates an operation of controlling a 3D image 401 using a rotation virtual tool in the 3D image control apparatus 300 shown in FIG. 3.

Referring to FIG. 4, a camera, an ultrasonic scanner, a laser scanner, and the like may be disposed at a bezel of the 3D image control apparatus 400. In an alternative embodiment, a sensor array may be disposed at an inside or a lower portion of the 3D image control apparatus 400.

The 3D image control apparatus 400 may display a virtual rotation tool 402 in a space disposed around the 3D image 401 based on spatial coordinates of the 3D image 401, the space being a space in which a stereoscopic effect of the 3D image 401 is not reduced. Here, the 3D image control apparatus 400 may display the virtual rotation tool 402 in the form of a trackball, based on attributes of the virtual rotation tool 402.

In addition, the 3D image control apparatus 400 may detect a user object 403 that may be used to manipulate the virtual rotation tool 402. The user object 403 may be detected, for example, using a camera. By detecting the user object 403, the 3D image control apparatus 400 may obtain spatial coordinates and a shape of the user object 403. Therefore, the 3D image control apparatus 400 may determine movement of the user object 403 based on the spatial coordinates and the shape of the user object 403. Here, the 3D image control apparatus 400 may determine whether the movement of the user object 403 is a rotation of the 3D image 401 in a certain direction performed by the virtual rotation tool. Here, the rotation in a certain direction may include, for example, a leftward rotation, a rightward rotation, a downward rotation, an upward rotation, and an oblique rotation.

The 3D image control apparatus 400 may determine a 3D image matching the determined movement of the user object as a target 3D image. Next, the 3D image control apparatus 400 may display the target 3D image instead of a currently displayed 3D image. Here, the 3D image control apparatus 400 may display the target 3D image along with a target virtual tool. That is, when the user object rotates the 3D image leftward using the virtual rotation tool, the 3D image control apparatus 400 may display the 3D image 401 rotating leftward, along with the virtual rotation tool rotating leftward.

Figure 5:
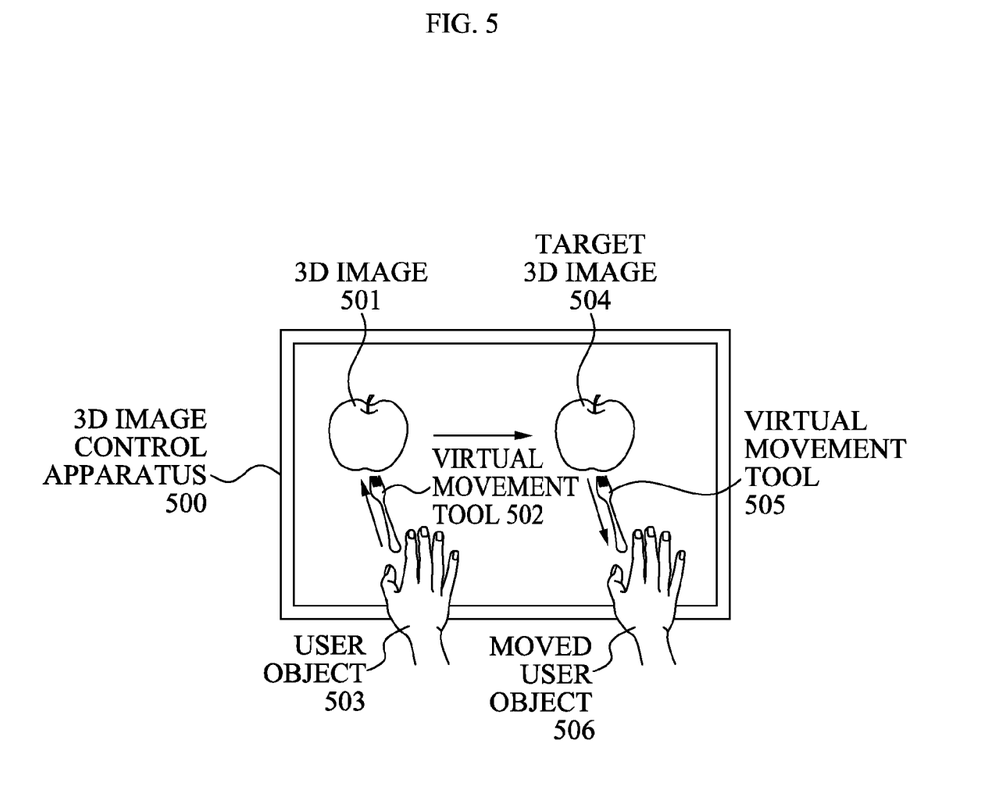
FIG. 5 illustrates an operation of controlling a 3D image using a virtual movement tool in the 3D image control apparatus shown in FIG. 3.

FIG. 5 illustrates an operation of controlling a 3D image using a virtual movement tool in the 3D image control apparatus 300 shown in FIG. 3.

Referring to FIG. 5, a camera, an ultrasonic scanner, a laser scanner, and the like may be disposed at a bezel of the 3D image control apparatus 500. In an alternative embodiment, a sensor array may be disposed at an inside or a lower portion of the 3D image control apparatus 500.

Here, the 3D image control apparatus 500 may display a virtual movement tool 502 in a space disposed around the 3D image 501 based on spatial coordinates of the 3D image 501, the space being a space in which a stereoscopic effect of the 3D image 501 is not reduced. Here, the 3D image control apparatus 500 may display the virtual movement tool 502 in the form of a fork, based on attributes of the virtual movement tool 502.

In addition, the 3D image control apparatus 500 may detect a user object 503 that manipulates the virtual movement tool 502 using a camera. By detecting the user object 503, the 3D image control apparatus 500 may obtain spatial coordinates and a shape of the user object 503. Therefore, the 3D image control apparatus 500 may determine movement of the user object 503 based on the spatial coordinates and the shape of the user object 503. Here, the 3D image control apparatus 500 may determine whether the movement of the user object 503 is movement of the 3D image 501 in a certain direction, such as a forward direction, a backward direction, an upward direction, a downward direction, a leftward direction, a rightward direction, an oblique direction, and the like, to be performed by the virtual movement tool 502.

Next, the 3D image control apparatus 500 may determine a 3D image matching the determined movement of the user object 503 as a target 3D image 504. The 3D image control apparatus 500 may display the target 3D image 504 instead of a currently displayed 3D image. Here, the 3D image control apparatus 500 may display the target 3D image 504 along with a target virtual tool. That is, when the user object 503 moves the 3D image rightward using the virtual movement tool, the 3D image control apparatus 500 may display the 3D image 501 moving rightward as the target 3D image 504. Here, as the 3D image is moved rightward, positions of the user object 503 and the 3D image 501 may be changed. Therefore, the 3D image control apparatus 500 may display the virtual movement tool 505 based on spatial coordinates of the target 3D image 504 and spatial coordinates of a moved user object 506 changed by the rightward movement of the 3D image.

Thus, since the 3D image control apparatus 500 moves rightward the virtual movement tool 505 being displayed according to the rightward movement of the 3D image and the user object 503, the moved user object 506 may continue natural control of the 3D image, even at the changed position. In addition, since the 3D image control apparatus 500 displays the virtual movement tool 505 based on spatial coordinates of the moved 3D image 504 and spatial coordinates of the moved user object 506, the virtual movement tool 505 may be displayed in the space in which the stereoscopic effect of the 3D image 504 is not reduced.

Figure 6:
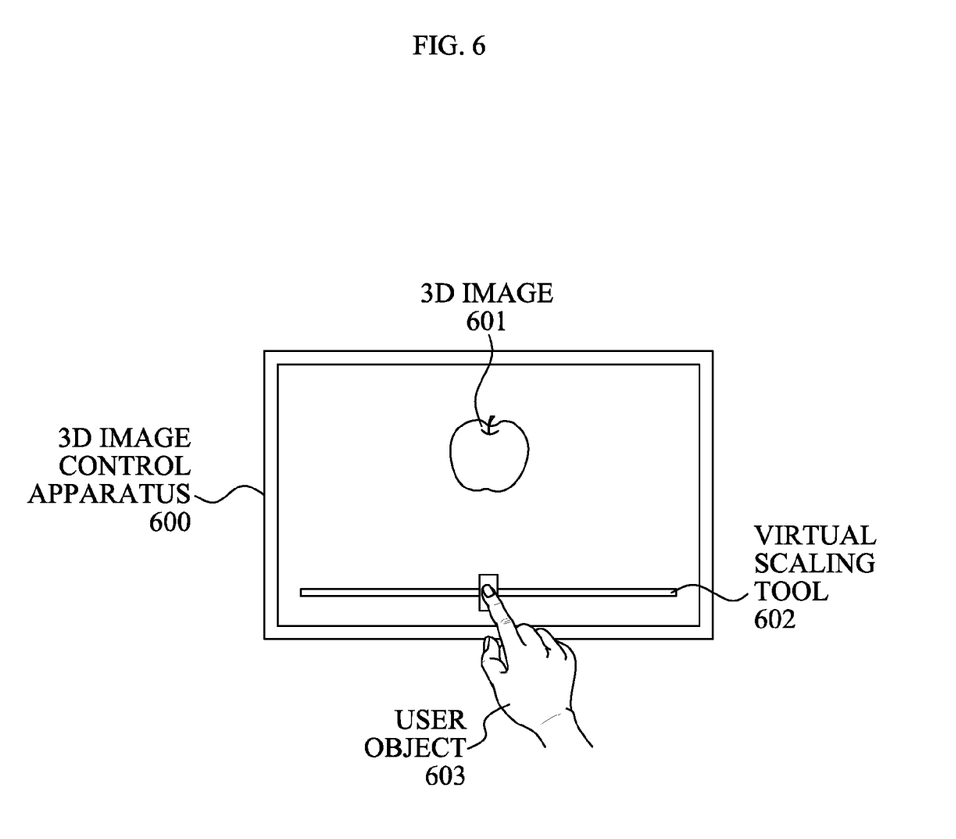
FIG. 6 illustrates an operation of controlling a 3D image using a virtual scaling tool in the 3D image control apparatus shown in FIG. 3.

FIG. 6 illustrates an operation of controlling a 3D image 601 using a virtual scaling tool in the 3D image control apparatus 300 shown in FIG. 3.

Referring to FIG. 6, a camera, an ultrasonic scanner, a laser scanner, and the like may be disposed at a bezel of the 3D image control apparatus 600. In an alternative embodiment, a sensor array may be disposed at an inside or a lower portion of the 3D image control apparatus 600.

Here, the 3D image control apparatus 600 may display a virtual scaling tool 602 in a space disposed around the 3D image 601 based on spatial coordinates of the 3D image 601, the space being a space in which a stereoscopic effect of the 3D image 601 is not reduced. Here, the 3D image control apparatus 600 may display the virtual scaling tool 602 in the form of a toolbar, based on attributes of the virtual scaling tool 602.

In addition, the 3D image control apparatus 600 may detect a user object 603 that manipulates the virtual scaling tool 602 using a camera. By detecting the user object 603, the 3D image control apparatus 600 may obtain spatial coordinates and a shape of the user object 603. Therefore, the 3D image control apparatus 600 may determine movement of the user object 603 based on the spatial coordinates and the shape of the user object 603. For example, the 3D image control apparatus 600 may determine whether, the movement of the user object 603 zooms-in or zooms-out of the 3D image 601, by a certain ratio, to be performed by the virtual scaling tool 602.

Next, the 3D image control apparatus 600 may determine a 3D image matching the determined movement of the user object 603 as a target 3D image. The 3D image control apparatus 600 may display the target 3D image instead of a currently displayed 3D image. Here, the 3D image control apparatus 600 may display the target 3D image along with the virtual scaling tool 602 which is a target virtual tool. That is, when the user object 603 zooms-in, the 3D image 601 using the virtual scaling tool 602, the 3D image control apparatus 600 may display a zoomed-in 3D image as the target 3D image. Also, when the user object 603 zooms-out, the 3D image 601 using the virtual scaling tool 602, the 3D image control apparatus 600 may display a zoomed-out 3D image as the target 3D image. Here, the 3D image control apparatus 600 may display the virtual scaling tool around the 3D image zoomed-into or the 3D image zoomed-out of.

Figure 7:
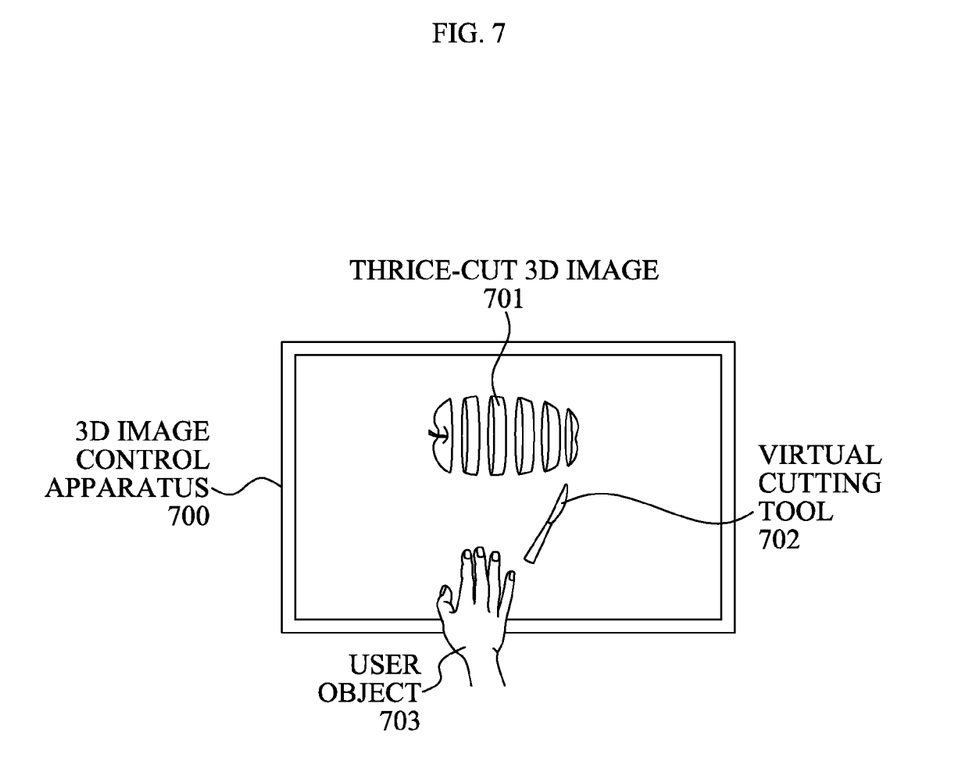
FIG. 7 illustrates an operation of controlling a 3D image using a virtual cutting tool in the 3D image control apparatus shown in FIG. 3.

FIG. 7 illustrates an operation of controlling a 3D image using a virtual cutting tool in the 3D image control apparatus 700 shown in FIG. 3.

Referring to FIG. 7, a camera, an ultrasonic scanner, a laser scanner, and the like may be disposed at a bezel of the 3D image control apparatus 700. In an alternative embodiment, a sensor array may be disposed at an inside or a lower portion of the 3D image control apparatus 700.

Here, the 3D image control apparatus 700 may display a virtual cutting tool 702 in a space disposed around the 3D image based on spatial coordinates of the 3D image, the space being a space in which a stereoscopic effect of the 3D image is not reduced. Here, the 3D image control apparatus 700 may display the virtual cutting tool 702 in the form of a knife, for example, based on attributes of the virtual cutting tool 702.

In addition, the 3D image control apparatus 700 may detect a user object 703 that manipulates the virtual cutting tool 702 using a camera. By detecting the user object 703, the 3D image control apparatus 700 may obtain spatial coordinates and a shape of the user object 703. Therefore, the 3D image control apparatus 700 may determine movement of the user object 703 based on the spatial coordinates and the shape of the user object 703. For example, the 3D image control apparatus 700 may determine whether the movement of the user object 703 is cutting the 3D image by a certain ratio, to be performed at least once by the virtual cutting tool 702.

Next, the 3D image control apparatus 700 may determine a 3D image matching the determined movement of the user object 703 as a target 3D image. The 3D image control apparatus 700 may display the target 3D image instead of a currently displayed 3D image. Here, the 3D image control apparatus 700 may display the target 3D image along with the virtual cutting tool 702 which is a target virtual tool. For example, when the user object 703 cuts the 3D image three times using the virtual cutting tool 702, the 3D image control apparatus 700 may display a thrice-cut 3D image 701 as the target 3D image. Also, the 3D image control apparatus 700 may display the thrice-cut 3D image 701 the virtual cutting tool 702 together.

Figure 8:
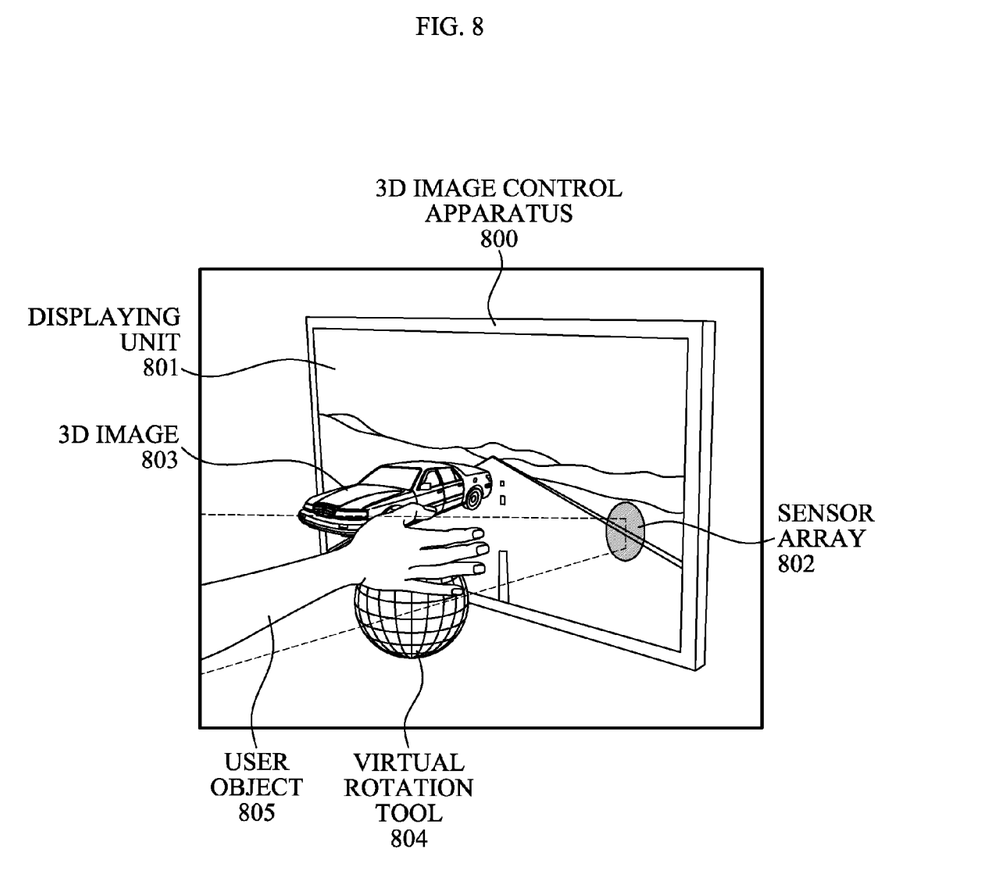
FIG. 8 illustrates an operation of controlling a 3D image using a sensor array in the 3D image control apparatus shown in FIG. 3.

FIG. 8 illustrates an operation of controlling a 3D image 803 using a sensor array 802 in the 3D image control apparatus 300 shown in FIG. 3.

Referring to FIG. 8, the sensor array 802 may be disposed at an inside or a lower portion of a displaying unit 801 provided to the 3D image control apparatus 800. Apart from a user object being detected by the sensor array 802 instead of the camera as in the 3D image control apparatus 400 shown in FIG. 4, the 3D image control apparatus 800 of FIG. 8 may operate in essentially the same manner as the 3D image control apparatus 400 of FIG. 4.

The 3D image control apparatus 800 may detect a user object 805 that manipulates a virtual rotation tool 804 using the sensor array 802. For example, the sensor array 802 may obtain spatial coordinates of the user object 805, a shape of the user object 805, and a distance between the user object 805 and the 3D image 803.

Therefore, the 3D image control apparatus 800 may determine movement of the user object 805 using at least one of the spatial coordinates of the user object 805, the shape of the user object 805, and the distance between the user object 805 and the 3D image 803. In addition, the 3D image control apparatus 800 may display a target 3D image matching the movement of the user object 805. Since a description of a process of determining and displaying the target 3D image using the virtual rotation tool is provided with reference to FIG. 4, a description about the process will not be repeated for conciseness and clarity of description.

Figure 9:
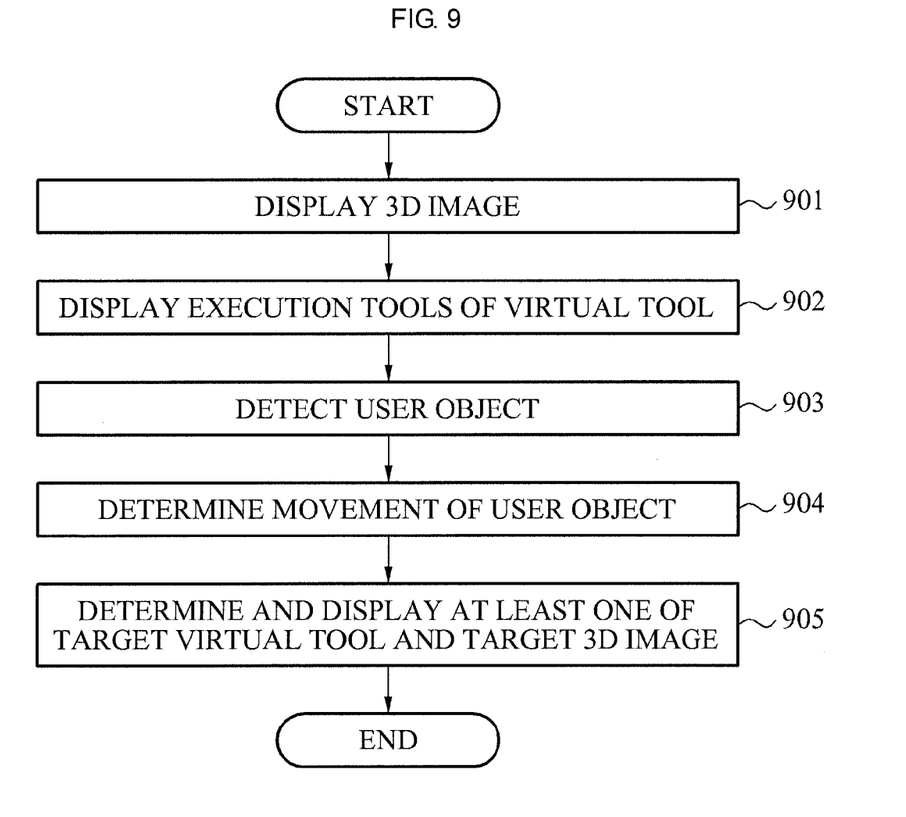
FIG. 9 illustrates a 3D image control method performed by the 3D image control apparatus shown in FIG. 3.

FIG. 9 illustrates a 3D image control method performed by the 3D image control apparatus shown in FIG. 3.

Referring to FIG. 9, the 3D image control apparatus may display a 3D image in operation 901.

In operation 902, the 3D image control apparatus may display execution tools of a virtual tool, around the 3D image. The execution tools refer to tools provided for execution of the virtual tool, and may be in the form of an icon, a menu, an animation, an image, and the like.

Here, the 3D image control apparatus may display the execution tools of the virtual tool in a space in which a stereoscopic effect of the 3D image is not reduced. For example, the 3D image control apparatus may determine the space in which a stereoscopic effect of the 3D image is not reduced, based on spatial coordinates of the 3D image and spatial coordinates of the user object, and may display the execution tools of the virtual tool in the determined space.

In operation 903, the 3D image control apparatus may detect the user object. For this, at least one of a camera, an ultrasonic scanner, a laser scanner, and a sensor array may be disposed on at least one of a bezel and a lower portion of the displaying unit of the 3D image control apparatus. Therefore, the 3D image control apparatus may detect the user object using at least one of the camera, the ultrasonic scanner, the laser scanner, and the sensor array.

By detecting the user object, the 3D image control apparatus may obtain spatial coordinates of the user object or a shape of the user object.

For example, when using the camera, the 3D image control apparatus may obtain the spatial coordinates of the user object and the shape of the user object.

As another example, when using the sensor array, the 3D image control apparatus may obtain the spatial coordinates of the user object, the shape of the user object, and a distance from the 3D image to the user object.

In this case, in operation 904, the 3D image control apparatus may determine movement of the user object based on at least one of the spatial coordinates of the user object, the shape of the user object, and the distance from the 3D image to the user object.

In operation 905, the 3D image control apparatus may determine and display at least one of a target virtual tool and a target 3D image, based on the movement of the user object.

Here, the 3D image control apparatus may display virtual tools having different attributes according to a type of the virtual tool.

For example, the 3D image control apparatus may determine an execution tool matching the movement of the user object in a state where the execution tools of the virtual tool are displayed around the 3D image. For example, when the virtual tool corresponding to the determined execution tool is a virtual rotation tool, the 3D image control apparatus may determine the virtual rotation tool to be the target virtual tool. Also, the 3D image control apparatus may display the target virtual tool around the 3D image.

As another example, when the virtual rotation tool is displayed and, in this state, the movement of the user object is determined as leftward rotation, the 3D image control apparatus may determine the virtual rotation tool as the target virtual tool. In this case, since a previous target virtual tool and a current target virtual tool are both the virtual rotation tool, the 3D image control apparatus may determine to change the display of the 3D image. In addition, the 3D image control apparatus may determine the 3D image matching the movement of the user object as the target 3D image. That is, the 3D image control apparatus may determine the 3D image rotating leftward as the target 3D image. Next, the 3D image control apparatus may display the 3D image rotating leftward and the virtual rotation tool together.

As still another example, when the virtual rotation tool is displayed and, in this state, the movement of the user object is determined as cutting, the 3D image control apparatus may determine the virtual cutting tool as the target virtual tool. In this case, since a previous target virtual tool, that is, the virtual rotation tool, and a current target virtual tool, that is, the virtual cutting tool, are different, the 3D image control apparatus may determine to change display of the virtual tool. Therefore, the 3D image control apparatus may change the virtual rotation tool being displayed to the virtual cutting tool. Here, when movement of cutting the 3D image by the user object is detected and therefore the movement of the user object is determined as cutting thrice, the 3D image control apparatus may determine a thrice-cut 3D image as the target 3D image. In addition, the 3D image control apparatus may display the thrice-cut 3D image along with the virtual cutting tool.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules described herein may be executed by a dedicated processor unique to that unit or by a processor common to one or more of the modules. The described methods may be executed on a general purpose computer or processor or may be executed on a particular machine such as the 3D image control apparatus described herein.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A 3-dimensional (3D) image control apparatus comprising:
    a sensing unit to detect a user object to control a 3D image using one of a plurality of virtual tools;
    a processor to determine a target virtual tool based on detection of 3D spatial coordinates of the user object and to determine a peripheral space adjoining the 3D image based on 3D spatial coordinates of the 3D image and the 3D spatial coordinates of the user object obtained by detecting the user object; and
    a displaying unit to display the target virtual tool in the determined peripheral space adjoining the 3D image, along with the 3D image,
    wherein the processor is further configured to determine a gesture of the user object based on the 3D spatial coordinates of the user object and a shape of the user object, to determine a virtual tool matching the gesture of the user object among the plurality of virtual tools, and to determine the determined virtual tool as the target virtual tool.

2. The 3D image control apparatus of claim 1, wherein the displaying unit displays the plurality of virtual tools in the peripheral space adjoining the 3D image determined based on spatial coordinates of the user object obtained by the detection of the user object and based on spatial coordinates of the 3D image.

3. The 3D image control apparatus of claim 1, wherein the sensing unit obtains spatial coordinates of the user object and a shape of the user object by detecting the user object.

4. The 3D image control apparatus of claim 3, wherein the processor determines movement of the user object based on the spatial coordinates and the shape of the user object obtained by the sensing unit.

5. The 3D image control apparatus of claim 4, wherein the processor determines an execution tool matching the movement of the user object among execution tools displayed around the 3D image, and determines the target virtual tool as a virtual tool that corresponds to the execution tool matching the movement of the user object.

6. The 3D image control apparatus of claim 1, wherein the sensing unit is disposed on at least one of a bezel of the displaying unit and a lower portion of the displaying unit.

7. The 3D image control apparatus of claim 1, wherein the displaying unit displays virtual tools comprising different attributes according to a type of the virtual tool set for the 3D image.

8. The 3D image control apparatus of claim 1, wherein the sensing unit detects the user object using at least one of a camera, an ultrasonic scanner, a laser scanner, and a sensor array.

9. A 3-dimensional (3D) image control method comprising:
    detecting, using a sensor, a user object to control a 3D image using one of a plurality of virtual tools;
    determining, using a processor, a target virtual tool based on detection of 3D spatial coordinates of the user object;
    determining, using the processor, a peripheral space adjoining the 3D image based on 3D spatial coordinates of the 3D image and the 3D spatial coordinates of the user object obtained by detecting the user object; and
    displaying, using a display apparatus, the target virtual tool in the determined peripheral space adjoining the 3D image, along with the 3D image,
    wherein the determining comprises:
    determining gesture of the user object based on the 3D spatial coordinates of the user object and a shape of the user object;
    determining a virtual tool matching the gesture of the user object among the plurality of virtual tools; and
    determining, the determined virtual tool as the target virtual tool.

10. The 3D image control method of claim 9, wherein the displaying displays the plurality of virtual tools in the peripheral space adjoining the 3D image determined based on spatial coordinates of the user object obtained by the detection of the user object and based on spatial coordinates of the 3D image.

11. The 3D image control method of claim 9, wherein the detecting obtains spatial coordinates of the user object and a shape of the user object by detecting the user object.

12. The 3D image control method of claim 11, wherein the determining determines movement of the user object based on the spatial coordinates and the shape of the user object.

13. The 3D image control method of claim 12, wherein the determining comprises:
    determining an execution tool matching the movement of the user object among execution tools displayed around the 3D image; and
    determining the target virtual tool as a virtual tool that corresponds to the execution tool matching the movement of the user object.

14. The 3D image control method of claim 9, wherein the displaying displays virtual tools comprising different attributes according to a type of the virtual tool set for the 3D image.

15. The 3D image control method of claim 9, wherein the sensor to detect the user object comprises at least one of a camera, an ultrasonic scanner, a laser scanner, and a sensor array.

16. A non-transitory computer readable recording medium storing a program to cause a computer to implement the method of claim 9.

17. A 3-dimensional (3D) image control apparatus comprising:
    a displaying unit to display a 3D image;
    a sensing unit to detect a movement of a user object to control a 3D image using one of a plurality of virtual tools;
    a processor to determine a peripheral space adjoining the 3D image based on 3D spatial coordinates of the 3D image and the 3D spatial coordinates of the user object obtained by the sensing unit; and
    wherein in the displaying unit displays the plurality of virtual tools in the determined peripheral space adjoining the 3D image,
    wherein the processor is further configured to determine a gesture of the user object based on the 3D spatial coordinates of the user object and a shape of the user object, to determine a virtual tool matching the gesture of the user object among the plurality of virtual tools, and to determine the determined virtual tool as the target virtual tool, wherein the target virtual tool is displayed along with the 3D image on the displaying unit.

18. The 3D image control apparatus of claim 17, wherein the displaying unit displays a target virtual tool, from among the plurality of virtual tools, concurrently with the 3D image, wherein the target virtual tool is determined from among the plurality of virtual tools based on the movement of the user object detected by the sensing unit.

19. The 3D image control apparatus of claim 17, wherein the sensing unit determines the movement of the user object based on spatial coordinates and a shape of the user object.

20. A 3-dimensional (3D) image control method comprising:

displaying a 3D image on a display apparatus;

detecting, using a sensor, a movement of a user object to control the 3D image using one of a plurality of virtual tools;

determining, using a processor, a peripheral space adjoining the 3D image based on 3D spatial coordinates of the 3D image and detected 3D spatial coordinates of the user object to control a 3D image using one of the plurality of virtual tools;

determining, using the processor, a target virtual tool based on detection of 3D spatial coordinates of the user object; and displaying, on the display apparatus, the target virtual tool for controlling the display of the 3D image in the peripheral space adjoining the 3D image, wherein the determining comprises:

determining a gesture of the user object based on the spatial coordinates of the user object and a shape of the user object;

determining, a virtual tool matching the gesture of the user object among the plurality of virtual tools; and determining the determined virtual tool as the target virtual tool.

* * * * *